US011184132B2

(12) United States Patent
Tsai et al.

(10) Patent No.: US 11,184,132 B2
(45) Date of Patent: Nov. 23, 2021

(54) TRANSMISSION CONFIGURATION INDICATION (TCI)—STATE INDICATION FOR NON-COHERENT JOINT TRANSMISSION (NCJT) CHANNEL STATE INFORMATION (CSI) REPORTING

(71) Applicant: MEDIATEK INC., Hsin-Chu (TW)

(72) Inventors: Lung-Sheng Tsai, Hsin-Chu (TW); Cheng-Rung Tsai, Hsin-Chu (TW); Weidong Yang, San Jose, CA (US)

(73) Assignee: MediaTek INC., Hsin-Chu (TW)

( * ) Notice: Subject to any disclaimer, the term of this patent is extended or adjusted under 35 U.S.C. 154(b) by 18 days.

(21) Appl. No.: 16/683,072

(22) Filed: Nov. 13, 2019

(65) Prior Publication Data

US 2020/0153497 A1 May 14, 2020

Related U.S. Application Data

(60) Provisional application No. 62/791,112, filed on Jan. 11, 2019, provisional application No. 62/767,606, (Continued)

(51) Int. Cl.
*H04B 17/336* (2015.01)
*H04L 5/00* (2006.01)
(Continued)

(52) U.S. Cl.
CPC ......... *H04L 5/0048* (2013.01); *H04B 7/0626* (2013.01); *H04B 7/0691* (2013.01);
(Continued)

(58) Field of Classification Search
CPC .... H04B 17/336; H04B 7/024; H04B 7/0626; H04B 7/0691; H04B 7/0695;
(Continued)

(56) References Cited

U.S. PATENT DOCUMENTS

| 2010/0074301 | A1  | 3/2010 | Howard et al. ............... 375/130 |
| 2018/0048372 | A1* | 2/2018 | Sun ...................... H04B 7/0639 |
| 2019/0141693 | A1* | 5/2019 | Guo ...................... H04L 5/0053 |

FOREIGN PATENT DOCUMENTS

| WO | WO2006019711 A1 | 7/2004 |
| WO | WO2018031397 A1 | 8/2018 |

OTHER PUBLICATIONS

International Search Report and Written Opinion of International Search Authority for PCT/CN2019/118421 dated Feb. 5, 2020 (8 pages).

(Continued)

*Primary Examiner* — Minh Trang T Nguyen
(74) *Attorney, Agent, or Firm* — Imperium Patent Works; Zheng Jin; Helen Mao

(57) ABSTRACT

Apparatus and methods are provided multiple transmission. In one novel aspect, TCI-state indication for non-coherent joint transmission (NCJT) channel station information (CSI) reporting is provided. The UE receives NCJT from at least a first transmission from a first transmission point (TRP) and a second transmission from a second TRP, determines a receiving (RX) spatial filter information for the NCJT and acquires channel state information (CSI) according to a report setting based on the determined RX spatial filter to simultaneously acquire at least two channel measurement resources (CMRs) and one interference measurement resource (IMR), wherein at least one CMR is from the first TRP and at least one CMR is from the second TRP. In one embodiment, the RX spatial filter information is determined based on a group-based beam reporting procedure performed by the UE. In another embodiment, the RX spatial filter information is determined based on TCI-state received from the wireless network.

18 Claims, 9 Drawing Sheets

Related U.S. Application Data filed on Nov. 15, 2018, provisional application No. 62/760,980, filed on Nov. 14, 2018.

(51) Int. Cl.
*H04L 27/26* (2006.01)
*H04W 72/04* (2009.01)
*H04B 7/06* (2006.01)
*H04W 24/10* (2009.01)

(52) U.S. Cl.
CPC ......... *H04B 17/336* (2015.01); *H04L 5/0035* (2013.01); *H04L 27/2602* (2013.01); *H04L 27/2627* (2013.01); *H04L 27/2649* (2013.01); *H04W 24/10* (2013.01); *H04W 72/042* (2013.01)

(58) Field of Classification Search
CPC .............. H04L 27/2602; H04L 27/2613; H04L 27/2627; H04L 27/2649; H04L 5/0035; H04L 5/0048; H04W 24/10; H04W 72/042

See application file for complete search history.

(56) References Cited

OTHER PUBLICATIONS

R1-1800529 3GPP TSG RAN WG1 Ad Hoc Meeting, Huawei et al., "Remaining issues for CSI framework", Vancouver, Canada, Jan. 22-26, 2018 (6 pages) *2.3 CSI Enhancement for multi-TRP coordinated transmission*.

R1-1804593 3GPP TSG-RAN WG1 #92bis, Sony, "Remaining issued on downlink beam management", Sanya, China, Apr. 16-20, 2018 (5 pages) *2.3 Support of P-1 procedure*.

* cited by examiner

TRANSMISSION CONFIGURATION INDICATION (TCI)—STATE INDICATION FOR NON-COHERENT JOINT TRANSMISSION (NCJT) CHANNEL STATE INFORMATION (CSI) REPORTING

CROSS REFERENCE TO RELATED APPLICATIONS

This application claims the benefit under 35 U.S.C. § 119 from U.S. provisional application Ser. No. 62/760,980, entitled "Reception of signals from multiple transmission points," filed on Nov. 14, 2018 and U.S. provisional application Ser. No. 62/767,606, entitled "PDCCH transmission and reception with multiple transmission points," filed on Nov. 15, 2018, and U.S. provisional application Ser. No. 62/791,112, entitled "Design consideration of multi-TRP based PDCCH" filed on Jan. 11, 2019, the subject matter of which is incorporated herein by reference.

TECHNICAL FIELD

The disclosed embodiments relate generally to wireless communication, and, more particularly, to transmission configuration indication (TCI)-state indication for non-coherent joint transmission (NCJT).

BACKGROUND

The fifth generation (5G) radio access technology (RAT) will be a key component of the modern access network. It will address high traffic growth and increasing demand for high-bandwidth connectivity. It will address high traffic growth, energy efficiency and increasing demand for high-bandwidth connectivity. It will also support massive numbers of connected devices and meet the real-time, high-reliability communication needs of mission-critical applications. In the legacy wireless communication, the mobile station is normally connected to a single serving base station and communicates with the serving base station for control and data transmission. The 5G network is designed with dense base station deployment and heterogeneous system design are deployed. The focus has shifted away from the single connection paradigm. Multiple-connection technologies, such as coordinated multipoint (CoMP) transmission, is expected to get more widely deployment to get higher data rate and higher spectral efficiency gains. The multiple-connection model for the wireless communicate requires the mobile station to coordinate with multiple transmission points (TRP) for reporting and control information reception.

Improvements are required for multi-connection communication.

SUMMARY

Apparatus and methods are provided for multiple transmission. In one novel aspect, TCI-state indication for non-coherent joint transmission (NCJT) channel station information (CSI) reporting is provided. The UE receives NCJT from at least a first transmission from a first transmission point (TRP) and a second transmission from a second TRP, determines a receiving (RX) spatial filter information for the NCJT and acquires channel state information (CSI) according to a report setting, based on the determined RX spatial filter to measure at least two channel measurement resources (CMRs) and at least one interference measurement resource (IMR), wherein at least one of the CMRs is associated the first TRP and at least one of the CMRs is associated with the second TRP. In one embodiment, the RX spatial filter information is determined based on a group-based beam reporting procedure performed by the UE. In one embodiment, the UE correlates and derives the RX spatial filter information for CSI acquisition based on another CSI report setting configured for beam management. The UE is either configure with one spatial filter for CSI acquisition or is configured with at least one of more than one panel and more than one spatial filters are used for the CSI acquisition. In another embodiment, RX spatial filter information is determined based on signal indication for one or more transmission configuration indication (TCI)-state values received from the wireless network. In one embodiment, the one or more TCI-state values is configured in the report setting. In one embodiment, multiple TCI-state values are configured in the report setting and a subset of the TCI-state values are selected to determine the RX spatial filter. In one embodiment, the signal indication for TCI-state is given by at least one of RRC configuration and dynamic signaling.

In another novel aspect, configurations for PDCCH transmission and reception with multiple transmission points are provided. The UE configures a PDCCH associated with a search space, which is associated with a control resource set (CORSET) comprising multiple control channel elements (CCEs), partitions the CORESET into multiple CCE groups each associated with a transmission configuration indication (TCI) state, wherein each TCI-state corresponds to a reference signal transmitted by a source transmission point (TRP), and receives downlink control information (DCI) via the PDCCH by the UE in a wireless network, wherein the PDCCH is transmitted according to at least a first TCI-state corresponding to a first source TRP and a second TCI-state corresponding to a second source TRP, and wherein each source TRP transmits corresponding portion of modulation symbols generated from the DCI on the corresponding first and second CCE group. In one embodiment, the CORESET is defined with multiple OFDM symbols, and wherein each CCE group comprises one or more OFDM symbols and the CCE groups are non-overlapping with each other in time domain. In one embodiment, the first and the second CCE groups are mapped to REs so that the CCE groups are non-overlapping with each other in frequency domain. In one embodiment, each CCE group comprises one or more resource element groups (REGs), and wherein the modulation symbols generated from the DCI are mapped to each REG based on predefined rules. In one embodiment, the modulation symbols are first mapped to REGs in the first CCE group, and subsequently mapped to REGs in the second CCE group. In another embodiment, the encoded DCI bits are mapped in an interleaved way to REGs in the first and the second CCE groups. In one embodiment, the UE further configures multiple TCI state sets for the CORESET, wherein each TCI state set contains TCI state values associated with the multiple CCE groups, and wherein each TCI-state corresponds to a reference signal transmitted by a source TRP and selects an active TCI state set from the configured multiple TCI state sets for the CORESET of the PDCCH. In another embodiment, the selecting of the active TCI state set is signaled by a MAC-control element (CE).

In another novel aspect, multiple TRPs information are provided for REG bundle configuration with PDCCH transmission and reception with multiple TRPs. The UE configures a PDCCH associated with a search space, which is associated with a control resource set (CORSET) comprising multiple control channel elements (CCEs), partitions the CORESET into multiple CCE groups, wherein each CCE group is associated with a TCI-state, and wherein each TCI-state corresponds to a reference signal sent by a source transmission point (TRP), configures multiple resource element group (REG) bundles each with multiple resource elements (REs), wherein the UE assumes the same precoder applied on PDCCH demodulation reference signal (DMRS) located within the REs that are in the same REG bundle and are associated with the same TCI-state, and receives downlink control information (DCI) via the PDCCH by the UE in a wireless network, wherein the PDCCH is transmitted according to at least a first TCI-state corresponding to a first source TRP and a second TCI-state corresponding to a second source TRP, and wherein each source TRP transmits corresponding portion of modulation symbols generated from the DCI on the corresponding first and second CCE group. In one embodiment, the REG bundles are predefined with each comprises only REs associated with the same TCI-state. In one embodiment, each CCE group corresponding to a TCI-state is indicated by the REG bundle configurations. In another embodiment, the CORESET is defined with multiple OFDM symbols, and wherein each CCE group is mapped to one or more OFDM symbols so that the CCE groups are non-overlapped with each other in time domain.

In yet another novel aspect, PDCCH configuration for PDCCH repetition transmission is provided. The UE configures a first physical downlink control channel (PDCCH) associated with a first transmission point (TRP) and a second PDCCH associated with a second transmission point (TRP), wherein a configuration for the second PDCCH is dependent upon a configuration for the first PDCCH, and receives downlink control information (DCI) via the first PDCCH and the second PDCCH by the UE in a wireless network. In one embodiment, the configuration for the second PDCCH is derived from the configuration for the first PDCCH. In one embodiment, the configuration for the second PDCCH is derived from the configuration for the first PDCCH. In another embodiment, resource elements (REs) allocated for the first PDCCH and REs allocated for the second PDCCH are non-overlapping, and wherein a resource allocation (RA) for the second PDCCH is an offset configuration of a RA for the first PDCCH. The offset is either in a time domain offset or a frequency domain offset. In yet another embodiment, resource elements (REs) allocated for the first PDCCH and REs allocated for the second PDCCH are identical.

This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
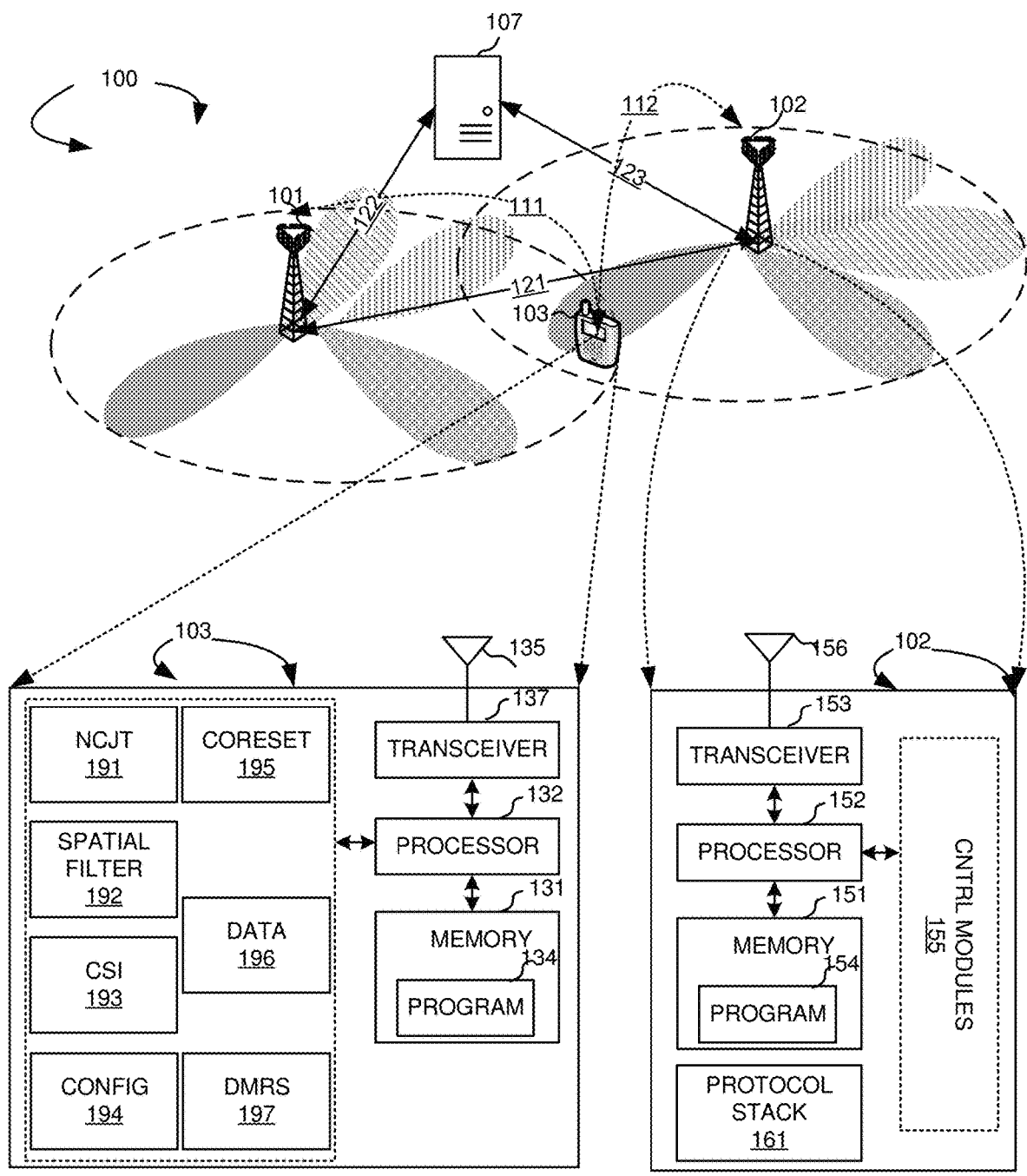
FIG. 1 is a schematic system diagram illustrating an exemplary wireless communication network with non-coherent joint transmission (NCJT) in accordance with embodiments of the current invention.

FIG. 1 is a schematic system diagram illustrating an exemplary wireless communication network 100 with non-coherent joint transmission (NCJT) in accordance with embodiments of the current invention. Wireless communication network 100 includes one or more fixed base infrastructure units forming a network distributed over a geographical region. The base unit may also be referred to as an access point, an access terminal, a base station, a Node-B, an eNode-B (eNB), a gNB, or by other terminology used in the art. As an example, base stations serve a number of mobile stations within a serving area, for example, a cell, or within a cell sector. In some systems, one or more base stations are coupled to a controller forming an access network that is coupled to one or more core networks. gNB 101 and gNB 102 are base stations in the wireless network, the serving area of which may or may not overlap with each other. As an example, user equipment (UE) 105 or mobile station 105 is in the serving area covered by gNB 101 and gNB 102. UE 105 is connected with gNB 101 via wireless link 111 and gNB 102 via wireless 112. gNB 101 is connected with gNB 102 via X2/Xn interface 121. UE 103 is in the overlapping service area of gNB 101 and gNB 102. In one embodiment, UE 103 is equipped and configured to be able connected with gNB 101 and gNB 102 simultaneously. A network entity, such as a wireless controller 107 is connected to base stations such as base station 101 and 102, via links of 122 and 123, respectively.

FIG. 1 further shows simplified block diagrams of gNB 102 and mobile station/UE 103 in accordance with the current invention. gNB 102 has an antenna 156, which transmits and receives radio signals. An RF transceiver module 153, coupled with the antenna, receives RF signals from antenna 156, converts them to baseband signals, and sends them to processor 152. RF transceiver 153 also converts received baseband signals from processor 152, converts them to RF signals, and sends out to antenna 156. Processor 152 processes the received baseband signals and invokes different functional modules to perform features in gNB 102. Memory 151 stores program instructions and data 154 to control the operations of gNB 102. gNB 102 has a protocol stack 161. gNB 102 also includes a set of control modules 155 that carry out functional tasks to communicate with mobile stations. Control modules 155 may include a NCJT module, a spatial filter module, a channel state information (CSI) module, a configuration module, a control resource set (CORSET) module, an activation module and data control module. Control modules 155 also handle the communication with one or more mobile stations for signaling and data transmission and reception. It coordinates with other candidate gNBs through Xnr interface.

UE 103 has an antenna 135, which transmits and receives radio signals. An RF transceiver module 137, coupled with the antenna, receives RF signals from antenna 135, converts them to baseband signals, and sends them to processor 132. In one embodiment, the RF transceiver may comprise two RF modules (not shown). A first RF module is used for HF transmitting and receiving, and the other RF module is used for different frequency bands transmitting and receiving which is different from the HF transceiver. RF transceiver 137 also converts received baseband signals from processor 132, converts them to RF signals, and sends out to antenna 135. Processor 132 processes the received baseband signals and invokes different functional modules to perform features in UE 103. Memory 131 stores program instructions and data 134 to control the operations of UE 103. Antenna 135 sends uplink transmission and receives downlink transmissions to/from antenna 156 of gNB 102.

Mobile station 103 also includes a set of control modules that carry out functional tasks. A NCJT module/s circuit 191 receives NCJT transmission, wherein the NCJT comprises at least a first transmission from a first transmission point (TRP) and a second transmission from a second TRP. A spatial filter module/circuit 192 determines a receiving (RX) spatial filter information for the NCJT. A CSI circuit/module 193 acquires CSI information according to a report setting and based on the determined RX spatial filter to measure at least two channel measurement resources (CMRs) and at least one interference measurement resource (IMR), wherein at least one of the CMRs is associated with a first reference signal from the first TRP and at least one of the CMRs is associated with a second reference signal from the second TRP. A configurator 194 configures a physical downlink control channel (PDCCH) associated with a search space, which is associated with a control resource set (CORESET) comprising multiple control channel elements (CCEs). A CORSET handler 195 partitions the CORESET into multiple CCE groups each associated with a transmission configuration indication (TCI) state, wherein each TCI-state corresponds to a reference signal transmitted by a source transmission point (TRP). A data handler 196 receives downlink control information (DCI) via the PDCCH by the UE in a wireless network, wherein the PDCCH is transmitted according to at least a first TCI-state corresponding to a first source TRP and a second TCI-state corresponding to a second source TRP, and wherein each source TRP transmits corresponding portion of modulation symbols generated from the DCI on the corresponding first and second CCE group. A DMRS handler 197 configures multiple resource element group (REG) bundles each with multiple resource elements (REs), wherein the UE assumes the same precoder applied on PDCCH demodulation reference signal (DMRS) located within the REs that are in the same REG bundle and are associated with the same TCI-state.

TCI-State Indication for NCJT

In a single-TRP (transmission points) transmission, for each TRP, beam management procedure is conducted independently. A UE can learn which Rx spatial filter is suitable for receiving each non-zero power (NZP) CSI-reference signal (RS) resource transmitted during beam management procedure. TCI-state-id is firstly given each TCI-state and each TCI-state is linked to either an NZP-CSIRS resource or synchronization signal block (SSB) for beam management with QCL assumptions. During the phase of CSI acquisition, the UE performs channel measurement and interference measurement on channel measurement resources (CMR) and interference management resources (IMR) to derive CSI. The Rx spatial filter information can be indicated by associating CMR or IMR with the NZP-CSIRS had been used for beam management via signaling TCI-state-id. For example, TCI-state-id=1 is further linked to the CMR/IMR for CSI acquisition transmitted by TRP #1, and TCI-state-id=2 is further linked to the CMR/IMR for CSI acquisition transmitted by TRP #2. The UE obtains Rx spatial filter information for CSI acquisition by looking up which Rx spatial filter is suitable to receive the NZP-CSIRS resource or SSB for beam management linked to the TCI-state-id. In one novel aspect, when the UE performs a NCJT, the UE determines one or more than one Rx spatial filters to simultaneously receive CMR/IMR from two TRPs. In one embodiment, the UE determines one or more than one Rx spatial filters based on a group-based beam reporting procedure performed by the UE. In another embodiment, the UE based on signal indication for transmission configuration indication (TCI)-state received from the wireless network based on signal indication for transmission configuration indication (TCI)-state received from the wireless network.

Figure 2:
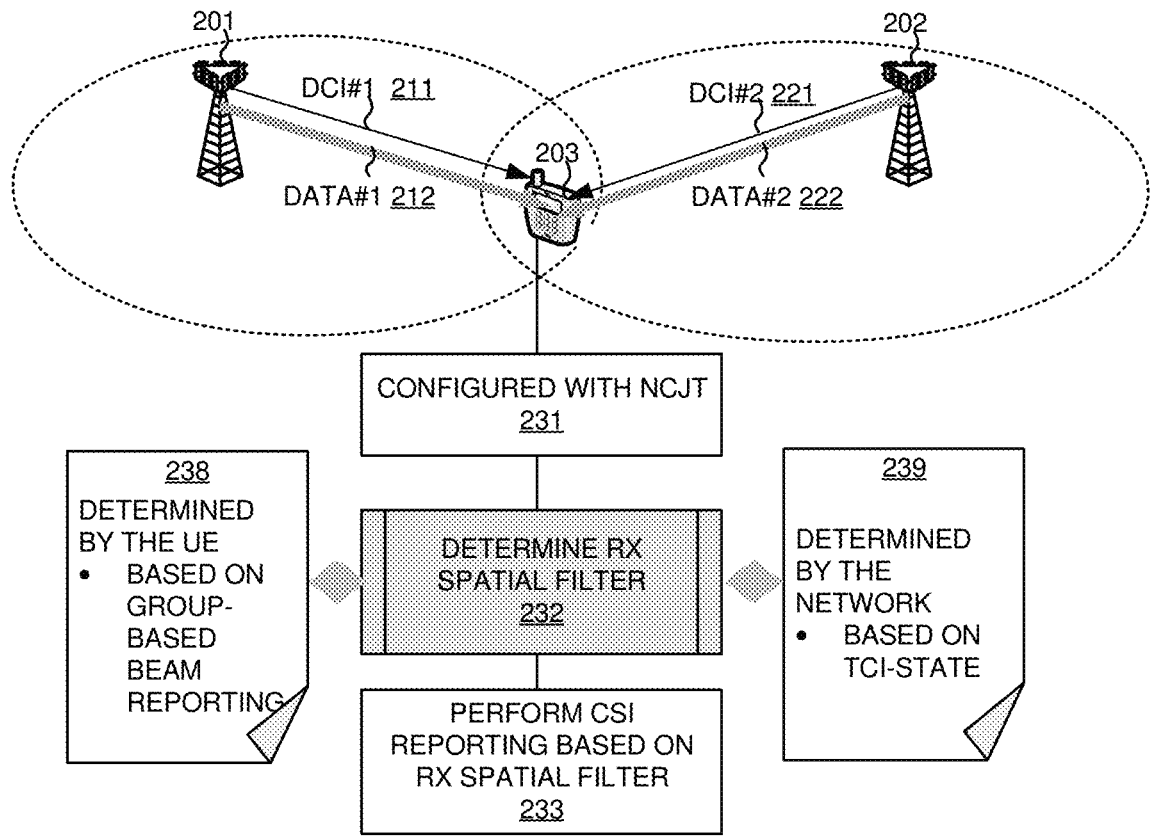
FIG. 2 illustrates exemplary diagrams for the UE to determine one or more than one Rx spatial filters to simultaneously receive CMR/IMR from two TRPs in accordance with embodiments of the current invention.

FIG. 2 illustrates exemplary diagrams for the UE to determine one or more than one Rx spatial filters to simultaneously receive CMR/IMR from two TRPs in accordance with embodiments of the current invention. A UE 203 is connected with a gNB 201 and a gNB 202 simultaneously. UE 203 receives downlink (DL) control information (DCI) #1 211 and data #1 212 from gNB 201. UE 203 receives DL DCI #2 221 and data #2 222 from gNB 202. In one novel aspect, UE 203 performs NCJT and receives DCI #1 211 and DCI #2 221 simultaneously. For multi-TRP case, it may be required to consider inter-TRP interference. For example, CSI considering inter-stream interference is needed for NCJT. At step 231, UE 203 is configured with NCJT. At step 232, UE 203 determines Rx spatial filters to simultaneously receive CMR/IMR from gNB 201 and gNB 202. In one embodiment, the UE determines the Rx spatial filters based on group-based beam reporting. In another embodiment, the Rx spatial filters are determined by the network. In one embodiment, the network signals the UE of the Rx spatial filters by TCI-state indication. Upon determining the Rx spatial filters, at step 233, UE 203 performs CSI reporting based the determined Rx spatial filters.

Figure 3:
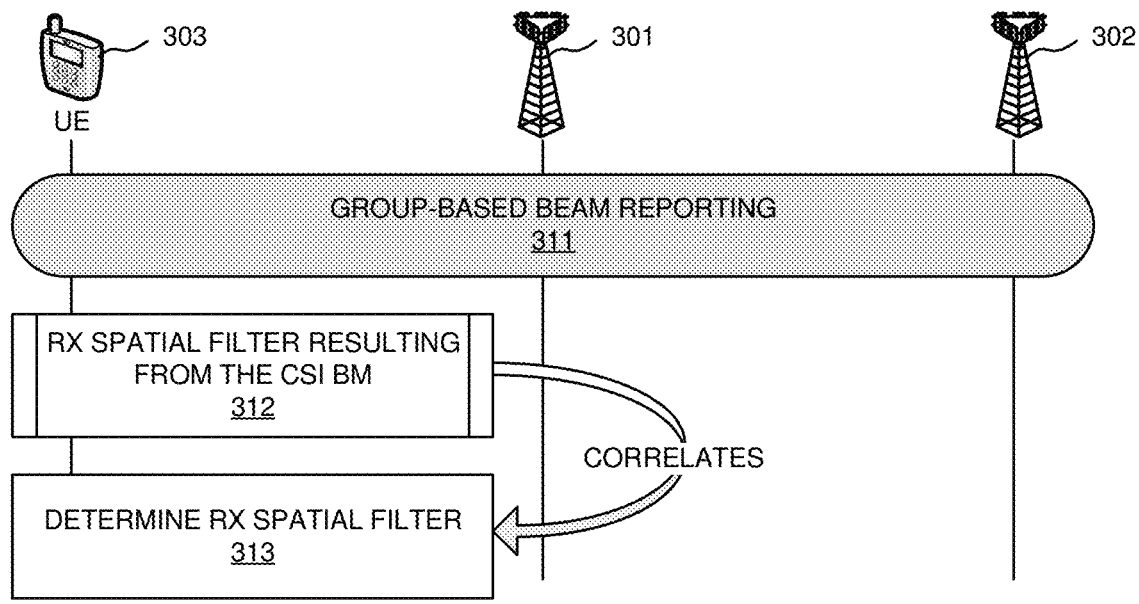
FIG. 3 illustrates an exemplary diagram for the UE to determine the Rx spatial filters based on group-based beam reporting in accordance with embodiments of the current invention.

FIG. 3 illustrates an exemplary diagram for the UE to determine the Rx spatial filters based on group-based beam reporting in accordance with embodiments of the current invention. In one embodiment, the UE determines the Rx spatial filters based on group-based beam reporting. A UE 303 is configured with NCJT. During CSI acquisition, UE 303 performs group-based beam reporting at step 311. The group-based beam reporting measures multiple TRP including gNB 301 and gNB 302. As a result, at step 312, the UE obtains Rx spatial filter information based on the group-based beam reporting measures. At step 313, UE 303 derives and determines RX spatial filter information for simultaneously receiving from gNB 302 and gNB 303. UE 303 may follow the Rx spatial filters derived during the stage for group-based beam reporting, to derive rank indicator (RI), pre-coding matrix indicator (PMI) and/or channel quality indicator (CQI). One Rx spatial filter or more than one spatial filters can be used to simultaneously receive the NZP-CSIRS resources for CSI acquisition. When the UE is equipped with more than one panel, multiple spatial filters may be used. In one embodiment, a correlation is created between the configuration for general CSI reports and the CSI acquisition. The CSI acquisition configuration is dependent upon the CSI reports such that the Rx spatial filter for NCJT is derived and obtained.

Based on the group-based beam reporting, the UE may obtain the Rx spatial filter information for NCJT. However, in some scenarios, the group-based beam reporting procedure is not enabled/available. In other scenarios, the report is associated with CSI-RS resources not the same as those resources associated with the group-based report. In some cases, the UE is aware to measure more than one NZP-CSIRS resources but does not know which TCI-state it should follow. In this case, network needs further indication for TCI assumption.

Figure 4:
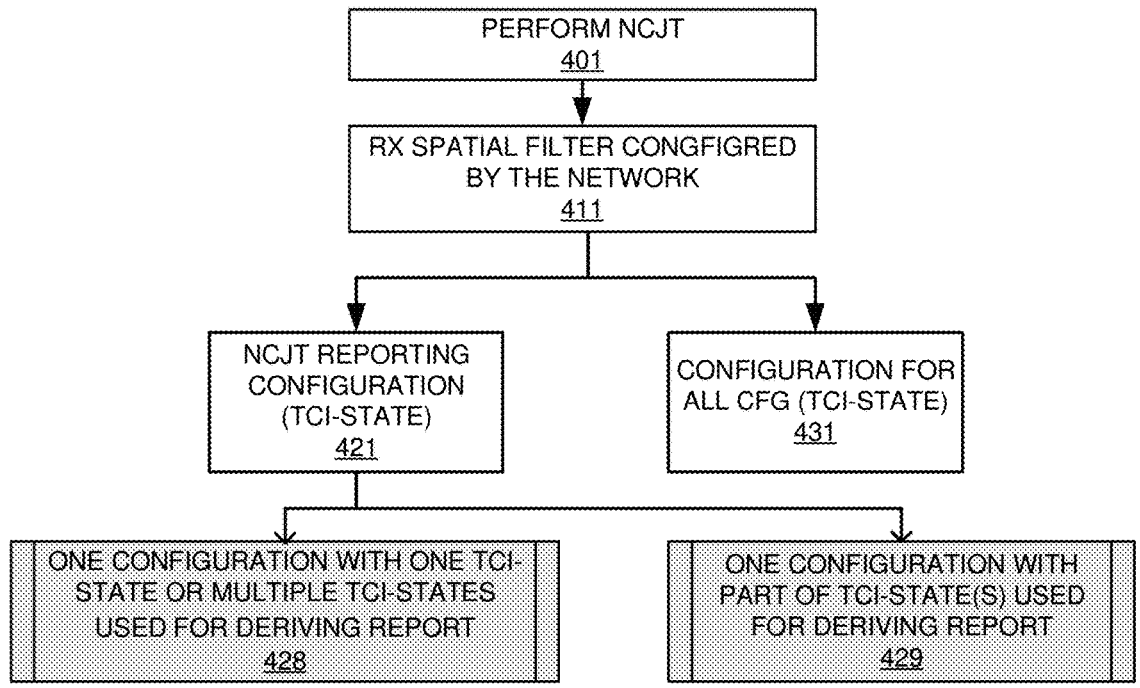
FIG. 4 illustrates an exemplary diagram for the UE to receive Rx spatial filters information from the network in accordance with embodiments of the current invention.

FIG. 4 illustrates an exemplary diagram for the UE to receive Rx spatial filters information from the network in accordance with embodiments of the current invention. In one embodiment, the Rx spatial filters are determined by the network and the network signals the UE of the Rx spatial filters by TCI-state indication. At step 401, the UE is aware to measure more than one NZP-CSIRS resources and is configured to perform NCJT. At step 411, the RX spatial filter information is configured for the UE by the network. In one embodiment, at step 421, the network indicates which TCI-state the UE should follow for only NCJT case. In another embodiment, at step 431, the network indicates which TCI-states the UE should follow for all cases including dynamic point selection (DPS) and NCJT. In one embodiment, the indication can be done by dynamic signaling, such as via PDCCH for CSI triggering, or is given in report setting. For the configuration for NCJT only, the indication on TCI-state may be configured in one report setting for the NCJT based reporting at step 428. In another embodiment, at step 429, the network configures multiple report settings for NCJT with different TCI-state values. The UE triggers part of the configuration for reporting.

PDCCH TX/RX With Multiple TRPS—CORESET Configuration

For multiple TRP transmissions, PDSCHs can be transmitted from different TRPs (cells), scheduling different PDSCHs or the same PDSCH, to a UE. Different PDSCHs scheduling the same PDSCH can be used to boost control robustness. A PDCCH can be associated with a search space, which in turn is associated with a CORESET. And the CCEs for one DCI can come from different TRPs. In one novel aspect, the PDCCH is transmitted by multiple TRPs. Upon receiving the PDCCH, the polar code decoding on the UE side needs to be performed on the joint transmission of coded bits of PDCCH once.

Figure 5:
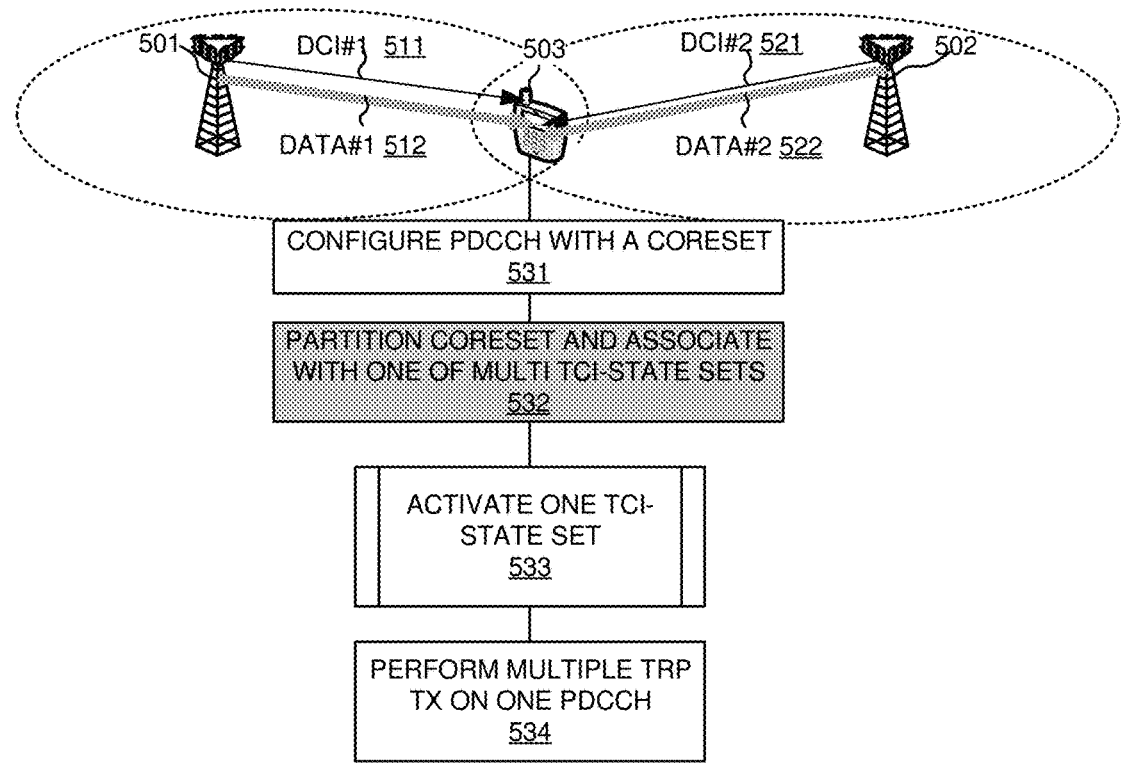
FIG. 5 illustrates exemplary diagrams for a UE to perform PDCCH TX/RX with multiple TRPs in accordance with embodiments of the current invention.

FIG. 5 illustrates exemplary diagrams for a UE to perform PDCCH TX/RX with multiple TRPs in accordance with embodiments of the current invention. In one novel aspect, a physical downlink control channel (PDCCH) can be associated with a search space, which in turn is associated with a CORESET. And the control channel elements (CCEs) for one DCI can come from different TRPs. A UE 503 is connected with a gNB 501 and a gNB 502 simultaneously. UE 503 receives control information DCI #1 511 and data #1 512 from gNB 501. UE 503 receives DL DCI #2 521 and data #2 522 from gNB 502. In one embodiment, the DCI #1 and DCI #2 contributes to the same DCI that UE 503 receives. gNB 501 transmits a part of the DCI information to UE 503 in DCI #1 511 and gNB 502 transmits another part of the DCI information to UE 503 in DCI #2 512. Both gNB 501 and gNB 502 use the same PDCCH. DCI #1 511 from gNB 501 and DCI #2 521 from gNB 502 fill the DCI information in the same PDCCH. At step 531, UE 503 configures a PDCCH with a CORSET. The PDCCH can be associated with a search space, which in turn is associated with the CORESET. The CORSET is configured with multiple CCEs. The CCEs for one DCI received by UE 503 comes from multiple TRPs, such as DCI #1 511 from gNB 501 and DCI #2 521 from gNB 502. At step 532, the CORSET is partitioned to multiple TCI-state sets. For example, the CORSET can be partitioned to TCI-state set #1 with {TCI-state #1, TCI-state #2} for TRP1 and TRP2. The CORSET is partitioned to TCI-state set #2 with {TCI-state #1, TCI-state #3} for TRP1 and TRP2. At step 533, one TCI-state set is activated. For example, TCI-state set #1 is activated and the CORSET is configured with CCE group1 corresponding to TCI-state #1 and CCE group corresponding to TCI-state #2. In one embodiment, the TCI-state set is activated through MAC-CE. When there is only one TCI-state set configured for the UE, MAC-CE activation is not needed.

The partitioning of resources within the CORESET can be at different levels. Specifically, TDM/FDM of the physical resource blocks (PRBs) in the CORESET or CCEs can be used to partition them among TRPs.

Figure 6:
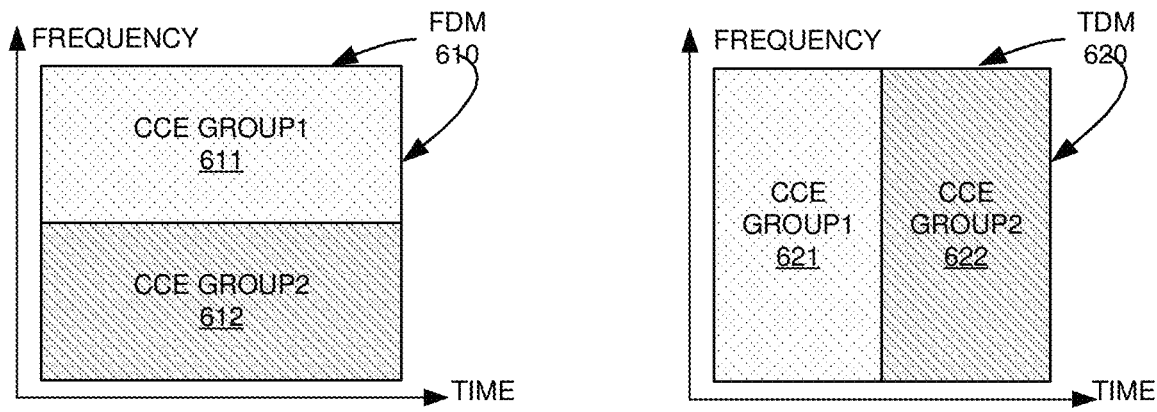
FIG. 6 illustrates exemplary diagrams for CORSET partitioning including FDM partitioning and TDM partitioning in accordance with embodiments of the current invention.

FIG. 6 illustrates exemplary diagrams for CORSET partitioning including FDM partitioning and TDM partitioning in accordance with embodiments of the current invention. The partitioning of resources within the CORESET can be at different levels. Specifically, FDM 610 of the CORESET or TDM 620 of the CORSET can be used to partition them among TRPs. In one novel aspect, the CORSET is partitioned into CCE groups. Each CCE group corresponds to a TRP. In the FDM 610 configuration example, CCE group1 611 and CCE group2 612 is configured separated in the frequency domain. In one embodiment, CCE group1 611 including CCEs 0-7 are from the first TRP and CCE group2 612 including CCEs 11-15 are from the second TRP. In one embodiment, a DCI is encoded and rate-matched and mapped into modulation symbols, and mapped to CCEs on one or more OFDM symbols. Different CCEs may be associated with TCI states with different TRPs. For example, CCEs 0-5 residing on symbol-1 can be associated with a TCI state with source signal from the first TRP. CCEs 6-11 residing on symbol-1 can be associated with a TCI state with source signal from the second TRP.

In another embodiment, the CORSET 620 is partitioned to multiple CCE groups by TDM. For example, CCEs on symbol-1 form CCE group1 621 is from the first TRP. CCEs on symbol-2 form CCE group2 622 is from the second TRP. In one method, a CORESET is defined with multiple OFDM symbols, and CCEs residing on a symbol are associated with a quasi-co-location (QCL) assumption or a TCI state with the source signal from one TRP. The source signal for the TCI states for different symbols may be from different TRPs. Consequently, a TCI state set is associated with a CORESET, with a TCI state associated with one or more symbols. For example, the CORSET is configured with three symbols symbol-1, symbol-2, and symbol-3. Symbol-1 and symbol-3 share the same TCI state with TRP1. Symbol-2 is associated another TCI state with TRP2. For multiple transmissions, whether the operating frequency is at FR1 or FR2 is also relevant. At FR2, it is possible a UE cannot receive signals from two TRPs simultaneously. The TDM partition works for both FR1 and FR2. In FR2, if a UE is not capable to form more than one Rx beams simultaneously, such as, the UE has only one panel, the FDM partitioning should be avoided. In the TMD partition, all the PRBs inside the CORESET at one symbol come from one TRP. The associated TRP is allowed to be different at different OFDM symbols. For PDCCH demodulation, different QCL assumptions are taken for different CCEs/symbols associated with different TRPs. In shared demodulation reference signal (DMRS) for PDCCH, for a particular TRP, DMRS RE(s) is transmitted only within PRBs belonging to the particular TRP. In one embodiment, QCL assumptions for different CCE groups can be signaled by MAC-CE and/or RRC signaling.

PDCCH Payload Mapping to Coreset

When the multiple-transmission is used for PDCCH, the encoded bits of PDCCH payload needs to map to the CORSET for different TRPs. There are different ways to map the payload.

Figure 7:
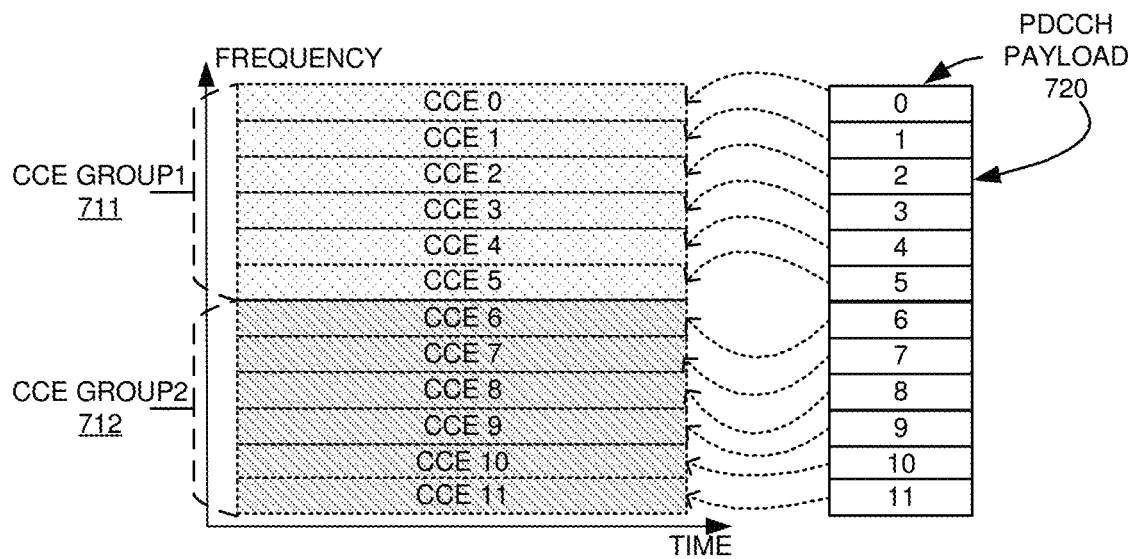
FIG. 7 illustrates an exemplary diagram for the sequential PDCCH payload mapping for multi-transmission from different TRPs in accordance with embodiments of the current invention.

FIG. 7 illustrates an exemplary diagram for the sequential PDCCH payload mapping for multi-transmission from different TRPs in accordance with embodiments of the current invention. In one embodiment, when the multiple-transmission is used for PDCCH, the encoded bits of PDCCH payload may be first mapped to resource element groups (REGs) belonging to CCEs associated with a first TCI state, and then mapped to REGs belonging to CCEs with a second TCI-state, and so on if we consider more than two TCI-states. PDCCH payload 720 is encoded with data number 0-11. The CORSET is partitioned to CCE group1 711 with CCE0 to CCE5 and CCE group2 with CCE6-CCE11. CCE group1 711 is associated with the first TRP and CCE group2 712 is associated with the second TRP. Payload data 720 is first mapped to the REGs belonging to CCEs associated with a first TCI state, which are CCE0 to CCE5 in CCE group1 711. Subsequently, payload data 720 is to the REGs belonging to CCEs associated with a second TCI state, which are CCE6 to CCE11 in CCE group2 712.

Figure 8:
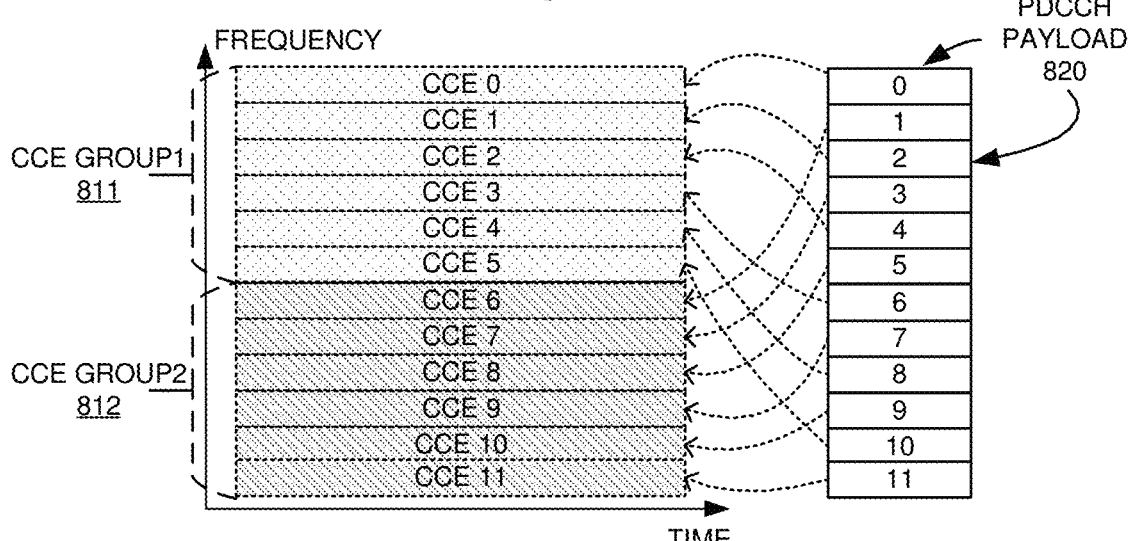
FIG. 8 illustrates an exemplary diagram for the interleaving PDCCH payload mapping for multi-transmission from different TRPs in accordance with embodiments of the current invention.

FIG. 8 illustrates an exemplary diagram for the interleaving PDCCH payload mapping for multi-transmission from different TRPs in accordance with embodiments of the current invention. PDCCH payload 820 is encoded with data number 0-11. The CORSET is partitioned to CCE group1 811 with CCE0 to CCE5 and CCE group2 with CCE6-CCE11. CCE group1 811 is associated with the first TRP and CCE group2 812 is associated with the second TRP.

DMRS Design for CORESET with CCEs from Multiple TRPs

REG bundling was introduced to allow a UE to assume the same precoder applied on PDCCH DMRS. It is related to the parameter precoderGranularity configured in a CORESET. The REs within a REG bundle could be across multiple symbols. The REs within a REG bundle could be across PRBs. In the case when shared DMRS for PDCCH is used, it is assumed that all the PRBs inside the CORESET at one symbol come from one TRP. The associated TRP is allowed to be different at different OFDM symbols. For PDCCH demodulation, different QCL assumptions are taken for different CCEs/symbols associated with different TRPs. In shared DMRS for PDCCH, for a particular TRP, DMRS RE(s) is transmitted only within PRBs belonging to the particular TRP.

Figure 9:
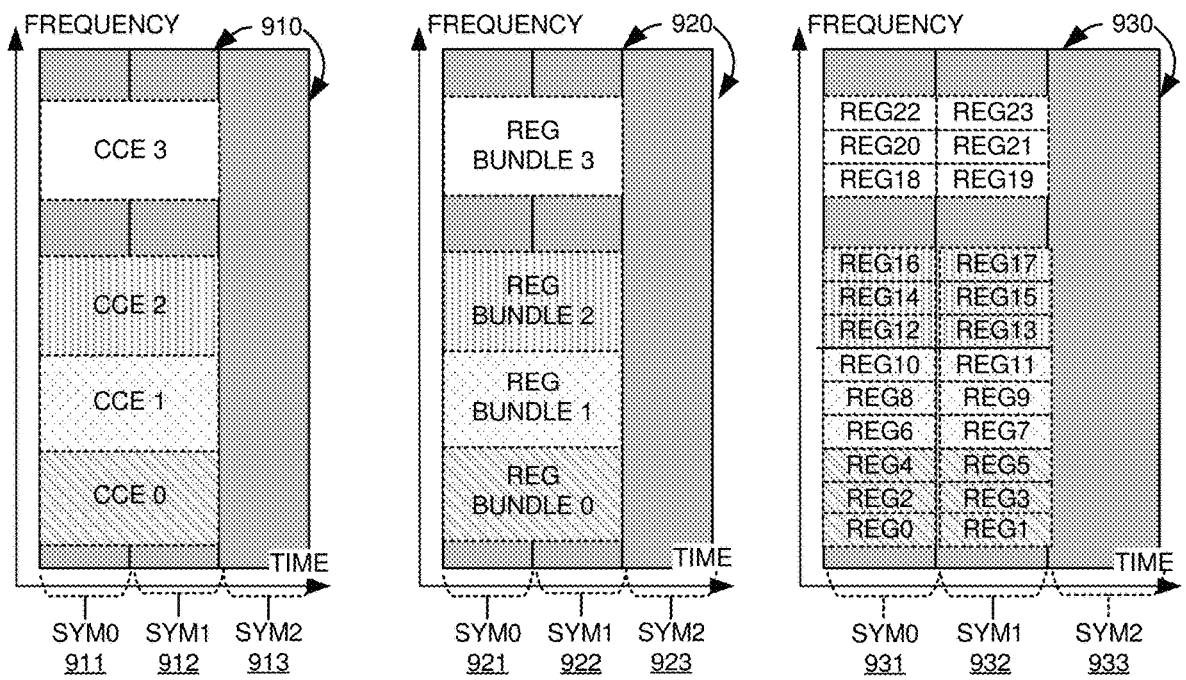
FIG. 9 illustrates exemplary diagrams for REG bundling with multiple TRP transmissions and DMRS handling in accordance with embodiments of the current invention.

FIG. 9 illustrates exemplary diagrams for REG bundling with multiple TRP transmissions and DMRS handling in accordance with embodiments of the current invention. CORESET 910 has symbol-1 911, symbol-2 912 and symbol-3 913. CCE groups are configured for CORESET 910 with CCE0, CCE1, CCE2 and CCE3. CORESET 920 has symbol-1 921, symbol-2 922 and symbol-3 923. REG bundles are configured with REG bundle0, REG bundle1, REG bundle2, and REG bundle3. CORESET 930 further illustrates the REG configuration for the CORSET 930, with symbol-1 931, symbol-2 932 and symbol-3 933. REG0-REG5 occupies symbol-1 931 and symbol-2 932 forms REG bundle0. Similarly, REG6-REG11 occupies symbol-1 931 and symbol-2 932 forms REG bundle1. REG12-REG17 occupies symbol-1 931 and symbol-2 932 forms REG bundle2. REG18-REG23 occupies symbol-1 931 and symbol-2 932 forms REG bundle3. In the single transmission case, the REG in the same REG bundling assume the same precoder applied. With multiple TRPs, more configuration information is needed. The REs within a REG bundle could be across multiple symbols. The REs within a REG bundle could be across PRBs. For example, CORSET 930 is configured with TDM multi-TRP with symbol-1 corresponding to the first TRP and symbol-2 corresponding to the second TRP. REG0 and REG1, though they are in the same REG bundle1, come from different TRPs. Therefore, the same pre-coder cannot be assumed. The UE can only assume the precoder is the same only for the REs which are within a REG bundle and are transmitted from the same TRP/panel. In one embodiment, for CCEs transmitted by each TRP, the configuration should include an indication for which CCEs are in the same group and are associated with one TRP. The groups are not overlapped. In one embodiment, a predefined rule may be specified to avoid huge overhead for such an indication. For example, the CCEs are divided into two groups in either time-domain or in frequency domain. For example, for a CORESET with two symbols, the first symbol is used by TRP-1 and the other one is used by TRP-2. In another embodiment, dynamic signaling may be used to configure different REGs in the REG bundling for multiple TRPs. The QCL assumption and/or TCI state for each group of CCEs should be indicated.

PDCCH Repetition

In another novel aspect, PDCCH repetition from multiple TRP are used. Identical DCI is carried by multiple PDCCHs. Each PDCCH is TRP-specific.

Figure 10:
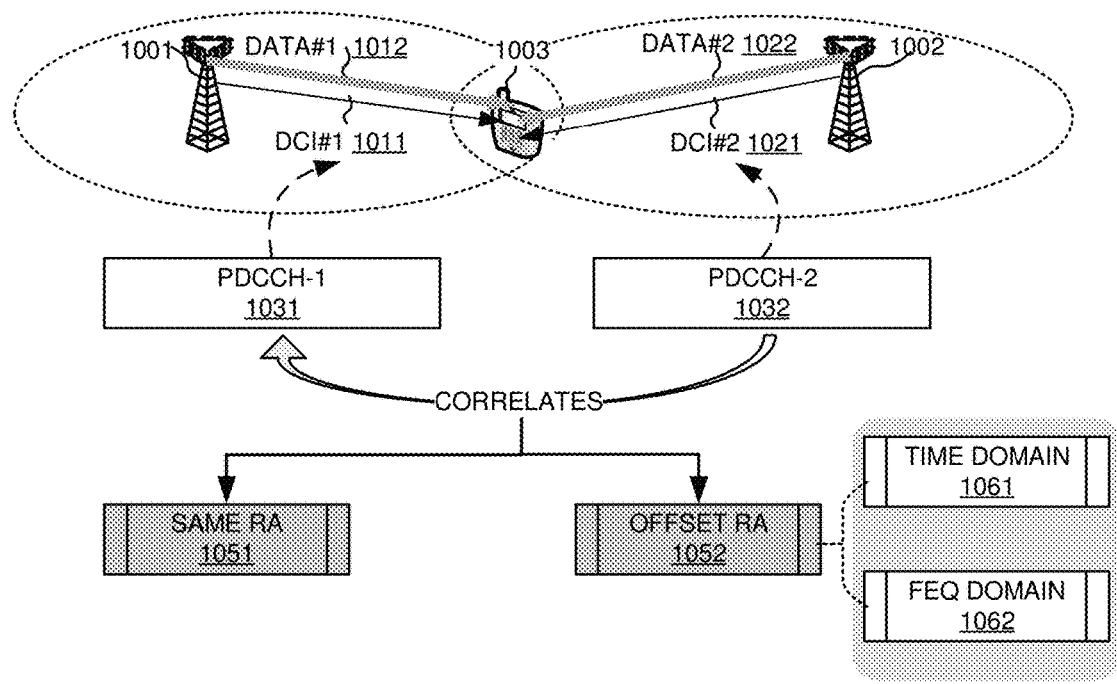
FIG. 10 illustrates exemplary diagrams for PDCCH repetition configuration for multiple PDCCHs in accordance with embodiments of the current invention.

FIG. 10 illustrates exemplary diagrams for PDCCH repetition configuration for multiple PDCCHs in accordance with embodiments of the current invention. A UE 1003 is connected with a gNB 1001 and a gNB 1002 simultaneously. UE 1003 receives control information DCI #1 1011 and data #1 1012 from gNB 1001. UE 1003 receives DL DCI #2 1021 and data #2 1022 from gNB 1002. In one embodiment, DCI #1 1011 and DCI #2 1021 are identical. DCI #1 1011 and DCI #2 1021 are transmitted to UE 1003 through different PDCCHs, PDCCH-1 1031 and PDCCH-2 1032. In one embodiment, the REs in PDCCH-1 1031 and PDCCH-2 1032 are either fully overlapped (MBSFN like) or partially overlapped or non-overlapped. In one embodiment, PDCCH-1 1031 and PDCCH-2 1032 are the same by using the same encoding parameters. In one novel aspect, dependency between the configuration settings of the two PDCCHs are used to reduce signaling overhead. Given the CORESET/search space configuration for PDCCH-1 1031 from TRP-1, a UE can assume a companion PDCCH-2 1032 may be transmitted by TRP-2. The resource allocation of PDCCH-2 1032 can be derived from the resource allocation of PDCCH-1 1031. In one embodiment, at step 1051, when PDCCH-1 1031 and PDCCH-2 1032 are non-overlapping, the same resource allocation is used for both PDCCH-1 1031 and PDCCH-2 1032. In one example, assuming fully overlapped RA for the PDCCHs, the two PDCCHs are the same. PDCCH-2 1032 is a copy of PDCCH-1 1031. The RE allocation for PDCCH-1 1031 from TRP-1 is also the same as that for PDCCH-2 1032 from TRP-2. In another embodiment, at step 1052, an offset is used. The RA of PDCCH-2 1032 is an offset version of the RA for PDCCH-1 1031. In one embodiment, at step 1061, the offset is in the time domain. In another embodiment, at step 1062, the offset is in the frequency domain. The UE may perform soft-combining to decode the DCI information bits. Offset in time domain may be preferred especially for the operation in FR2. It allows beam switch among symbols. If the two PDCCHs are overlapped in time domain, constraint/dependency should be introduced to avoid ambiguity for QCL/TCI assumption for UE's signal reception.

Figure 11:
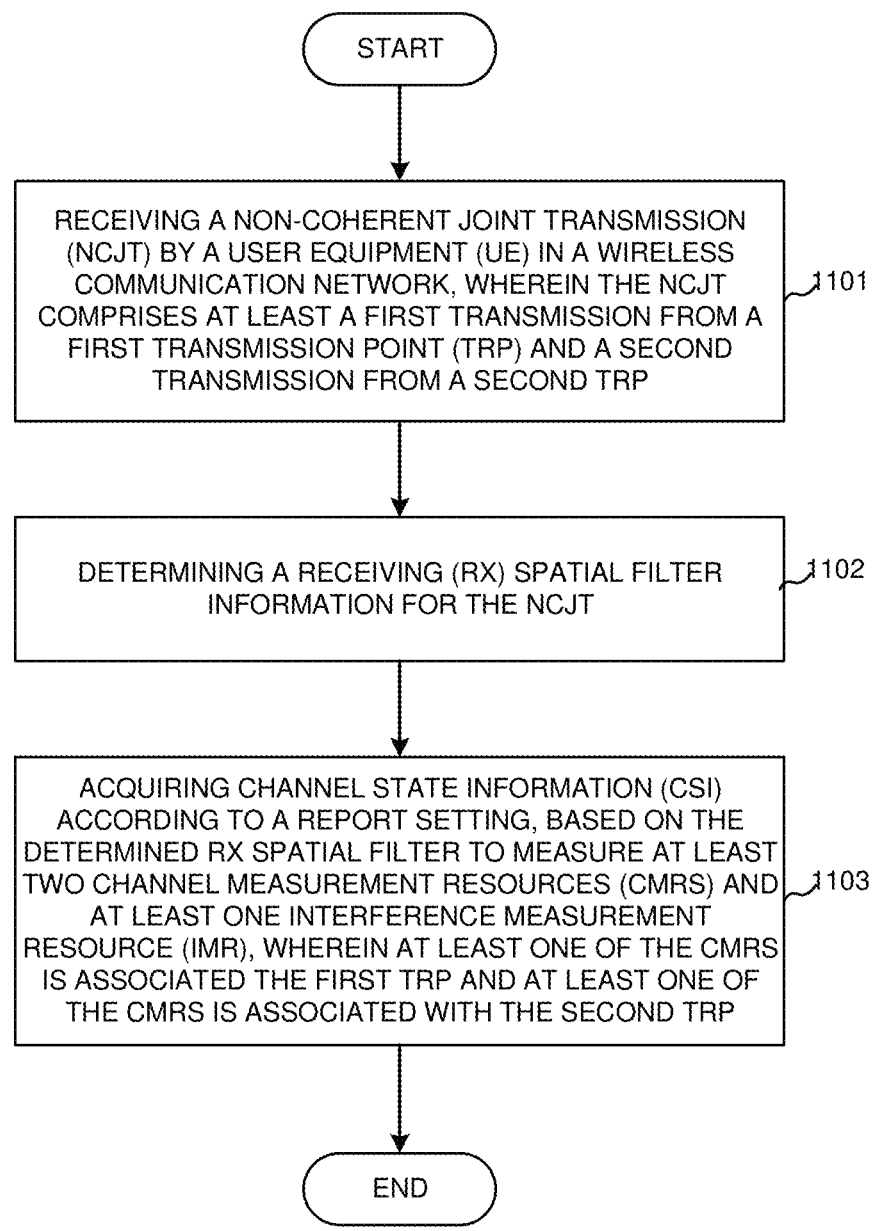
FIG. 11 illustrates an exemplary flow chart for the TCI-state indication for the NCJT in accordance with embodiments of the current invention.

FIG. 11 illustrates an exemplary flow chart for the TCI-state indication for the NCJT in accordance with embodiments of the current invention. At step 1101, the UE receives a NCJT in a wireless communication network, wherein the NCJT comprises at least a first transmission from a first transmission point (TRP) and a second transmission from a second TRP. At step 1102, the UE determines a receiving (RX) spatial filter information for the NCJT. At step 1103, the UE acquires channel state information (CSI) according to a report setting, based on the determined RX spatial filter to measure at least two channel measurement resources (CMRs) and at least one interference measurement resource (IMR), wherein at least one of the CMRs is associated the first TRP and at least one of the CMRs is associated with the second TRP.

Figure 12:
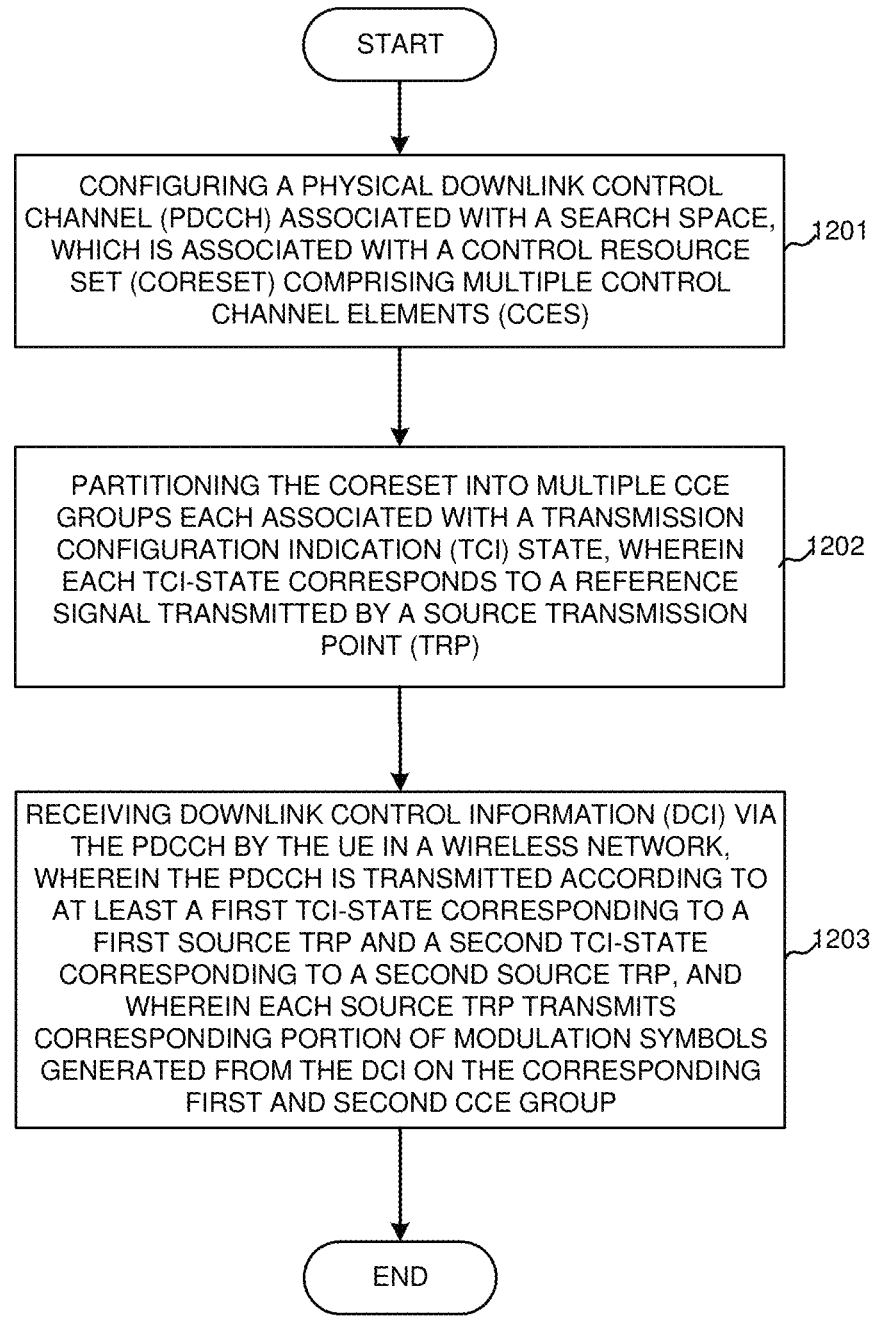
FIG. 12 illustrates an exemplary flow chart for PDCCH transmission and reception with multiple transmission points in accordance with embodiments of the current invention.

FIG. 12 illustrates an exemplary flow chart for PDCCH transmission and reception with multiple transmission points in accordance with embodiments of the current invention. At step 1201, the UE configures a PDCCH associated with a search space, which is associated with a CORSET comprising multiple CCEs. At step 1202, the UE partitions the CORESET into multiple CCE groups each associated with a transmission configuration indication (TCI) state, wherein each TCI-state corresponds to a reference signal transmitted by a source transmission point (TRP). At step 1203, the UE receives downlink control information (DCI) via the PDCCH by the UE in a wireless network, wherein the PDCCH is transmitted according to at least a first TCI-state corresponding to a first source TRP and a second TCI-state corresponding to a second source TRP, and wherein each source TRP transmits corresponding portion of modulation symbols generated from the DCI on the corresponding first and second CCE group.

Figure 13:
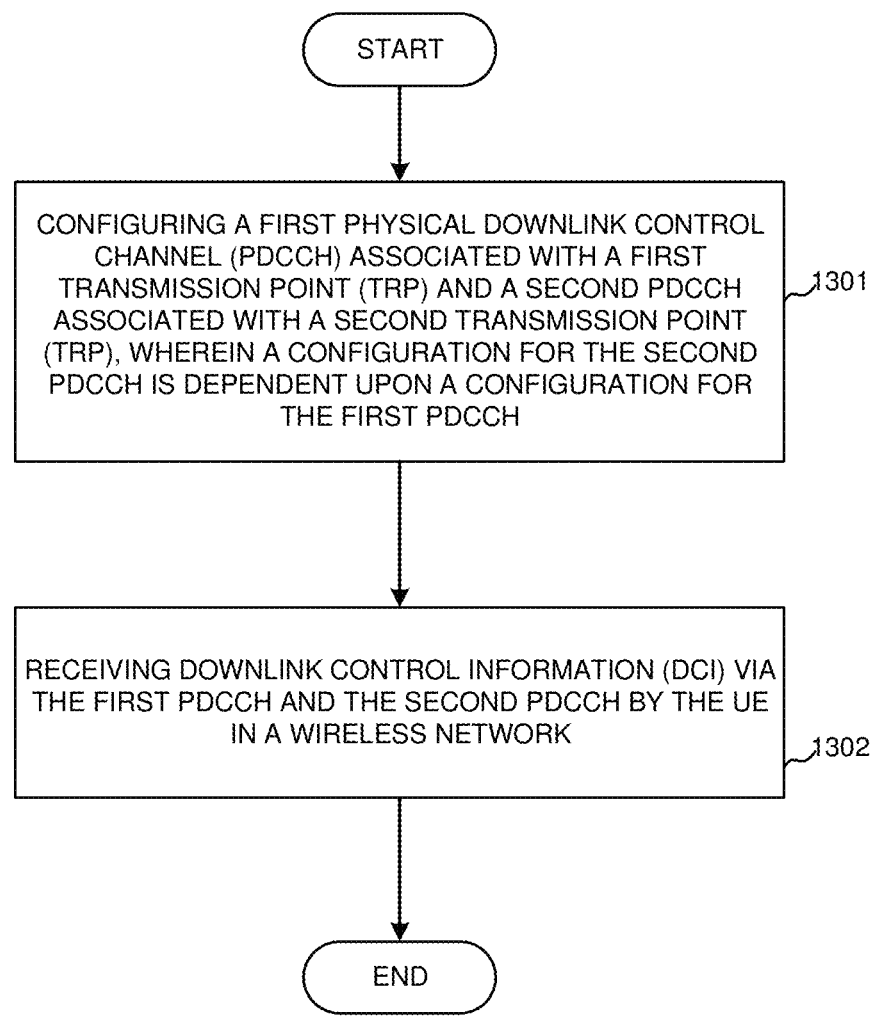
FIG. 13 illustrates an exemplary flow chart for PDCCH repetition configuration with multiple transmission points in accordance with embodiments of the current invention.

FIG. 13 illustrates an exemplary flow chart for PDCCH repetition configuration with multiple transmission points in accordance with embodiments of the current invention. At step 1301, the UE configures a first physical downlink control channel (PDCCH) associated with a first transmission point (TRP) and a second PDCCH associated with a second transmission point (TRP), wherein a configuration for the second PDCCH is dependent upon a configuration for the first PDCCH. At step 1302, the UE receives downlink control information (DCI) via the PDCCH by the UE in a wireless network.

Figure 14:
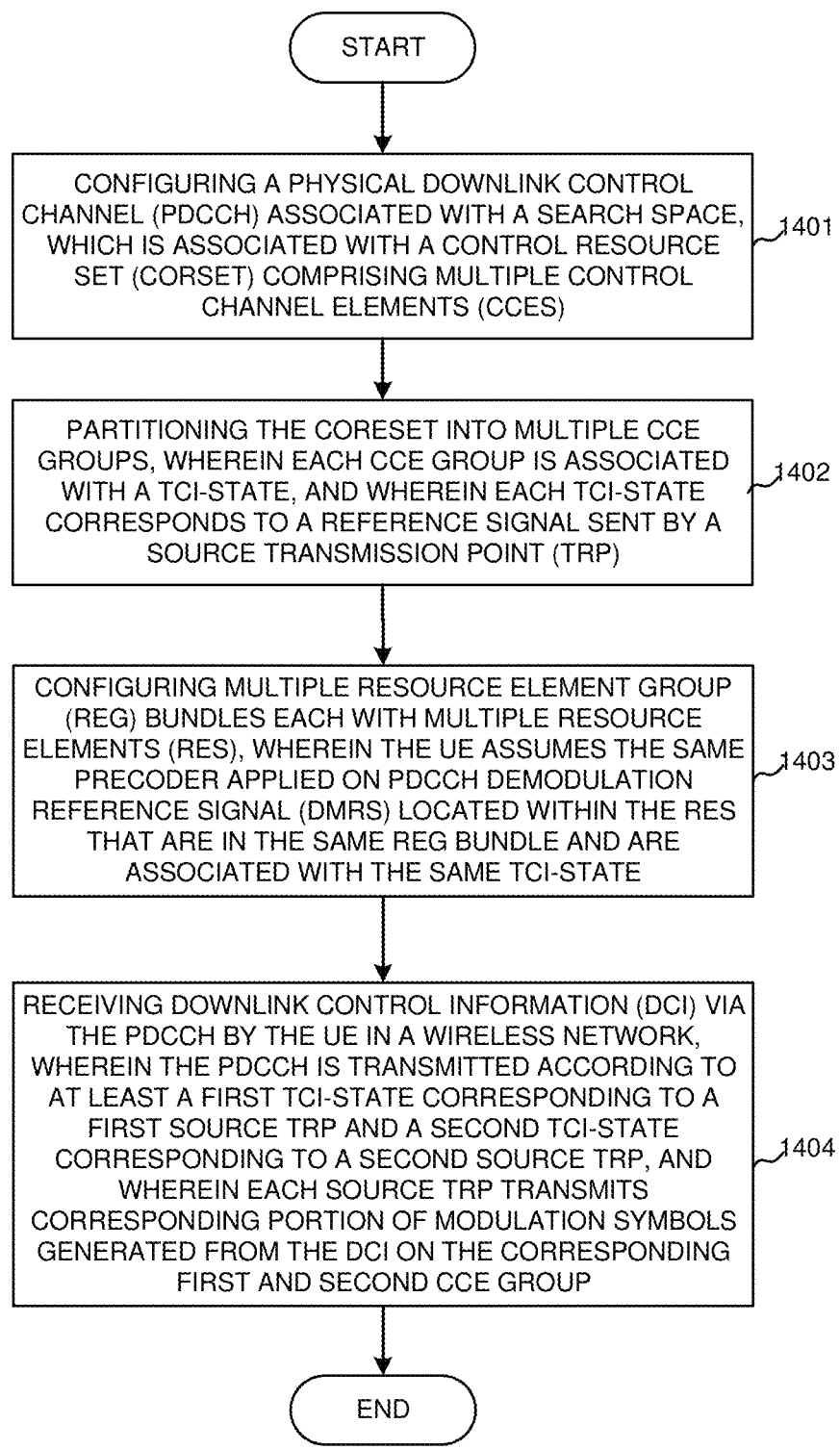
FIG. 14 illustrates an exemplary flow chart for PDCCH DMRS handling with multiple transmission in accordance with embodiments of the current invention.

FIG. 14 illustrates an exemplary flow chart for PDCCH DMRS handling with multiple transmission in accordance with embodiments of the current invention. At step 1401, the UE configuring a physical downlink control channel (PDCCH) associated with a search space, which is associated with a control resource set (CORSET) comprising multiple control channel elements (CCEs). At step 1402, the UE partitions the CORESET into multiple CCE groups, wherein each CCE group is associated with a TCI-state, and wherein each TCI-state corresponds to a reference signal sent by a source transmission point (TRP). At step 1403, the UE multiple resource element group (REG) bundles each with multiple resource elements (REs), wherein the UE assumes the same precoder applied on PDCCH demodulation reference signal (DMRS) located within the REs that are in the same REG bundle and are associated with the same TCI-state. At step 1404, the UE downlink control information (DCI) via the PDCCH by the UE in a wireless network, wherein the PDCCH is transmitted according to at least a first TCI-state corresponding to a first source TRP and a second TCI-state corresponding to a second source TRP, and wherein each source TRP transmits corresponding portion of modulation symbols generated from the DCI on the corresponding first and second CCE group.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
receiving a non-coherent joint transmission (NCJT) by a user equipment (UE) in a wireless communication network, wherein the NCJT comprises at least a first transmission from a first transmission point (TRP) and a second transmission from a second TRP;
determining a receiving (RX) spatial filter information for the NCJT;
acquiring channel state information (CSI) according to a report setting and one or more RX spatial filters based on the determined RX spatial filter information; and
measuring at least two channel measurement resources (CMRs) and at least one interference measurement resource (IMR) responsive to acquiring the CSI, wherein at least one of the CMRs is associated with the first TRP and at least one of the CMRs is associated the second TRP.

2. The method of claim 1, wherein RX spatial filter information is determined based on a group-based beam reporting procedure performed by the UE.

3. The method of claim 2, wherein the UE correlates and derives the RX spatial filter information for CSI acquisition based on another CSI report setting configured for beam management.

4. The method of claim 2, wherein one spatial filter is used for CSI acquisition.

5. The method of claim 2, wherein the UE is configured with at least one of more than one panel and more than one spatial filters are used for the CSI acquisition.

6. The method of claim 1, wherein RX spatial filter information is determined based on signal indication for one or more transmission configuration indication (TCI)-state values received from the wireless network.

7. The method of claim 6, wherein the one or more TCI-state values is configured in the report setting.

8. The method of claim 7, wherein multiple TCI-state values are configured in the report setting and a subset of the TCI-state values are selected to determine the RX spatial filter.

9. The method of claim 6, wherein the signal indication for TCI-state is given by at least one of RRC configuration and dynamic signaling.

10. A user equipment (UE) comprising:
   a radio frequency (RF) transceiver that transmits and receives radio signals in a wireless network;
   a non-coherent joint transmission (NCJT) circuit that receives NCJT transmission, wherein the NCJT comprises at least a first transmission from a first transmission point (TRP) and a second transmission from a second TRP;
   a spatial filter circuit that determines a receiving (RX) spatial filter information for the NCJT; and
   a channel state information (CSI) circuit that acquires CSI information according to a report setting and one or more RX spatial filters based on the determined RX spatial filter information, and to measures at least two channel measurement resources (CMRs) and at least one interference measurement resource (IMR)) responsive to acquiring the CSI, wherein at least one of the CMRs is associated with the first TRP and at least one of the CMRs is associated with the second TRP.

11. The UE of claim 10, wherein RX spatial filter information is determined based on a group-based beam reporting procedure performed by the UE.

12. The UE of claim 11, wherein the UE correlates and derives the RX spatial filter information for CSI acquisition based on another CSI report setting configured for beam management.

13. The UE of claim 12, wherein one spatial filter is used for CSI acquisition.

14. The UE of claim 11, wherein the UE is configured with at least one of more than one panel and more than one spatial filters are used for the CSI acquisition.

15. The UE of claim 10, wherein RX spatial filter information is determined based on signal indication for one or more transmission configuration indication (TCI)-state values received from the wireless network.

16. The UE of claim 15, wherein the one or more TCI-state values is configured in the report setting.

17. The UE of claim 16, wherein multiple TCI-state values are configured in the report setting and a subset of the TCI-state values are selected to determine the RX spatial filter.

18. The UE of claim 15, wherein the signal indication for TCI-state is given by at least one of RRC configuration and dynamic signaling.

* * * * *

UNITED STATES PATENT AND TRADEMARK OFFICE
CERTIFICATE OF CORRECTION

Page 1 of 1

PATENT NO. : 11,184,132 B2
APPLICATION NO. : 16/683072
DATED : November 23, 2021
INVENTOR(S) : Lung-Sheng Tsai et al.

It is certified that error appears in the above-identified patent and that said Letters Patent is hereby corrected as shown below:

In the Claims

Column 13 Line 27, the word "to" needs to be deleted.

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*